United States Patent
Wang

(10) Patent No.: US 7,582,212 B2
(45) Date of Patent: Sep. 1, 2009

(54) METHOD OF REMOVING SILICON DIOXIDE FROM WASTE LIQUID, METHOD OF CLEANING MEMBRANE TUBE AND METHOD OF PROCESSING WASTE WATER

(75) Inventor: Hao-Cheng Wang, Taipei (TW)

(73) Assignee: United Microelectronics Corp., Hsinchu (TW)

( * ) Notice: Subject to any disclaimer, the term of this patent is extended or adjusted under 35 U.S.C. 154(b) by 653 days.

(21) Appl. No.: 11/223,496

(22) Filed: Sep. 8, 2005

(65) Prior Publication Data

US 2007/0051678 A1    Mar. 8, 2007

(51) Int. Cl.
*B01D 65/02* (2006.01)
(52) U.S. Cl. .............. 210/636; 134/22.13; 134/29; 134/902; 210/650; 210/749; 451/46
(58) Field of Classification Search .......... 210/636, 210/638, 639, 650–652, 739, 751, 758, 759, 210/806, 702, 719, 749; 134/22.1, 22.11–22.15, 134/26–29, 902; 451/36, 60, 446
See application file for complete search history.

(56) References Cited

U.S. PATENT DOCUMENTS

| | | | | |
|---|---|---|---|---|
| 404,180 A | * | 5/1889 | Doremus | 210/702 |
| 3,414,497 A | * | 12/1968 | Kanai | 205/758 |
| 4,207,183 A | * | 6/1980 | Herrigel | 204/518 |
| 5,527,466 A | * | 6/1996 | Li et al. | 210/636 |
| 5,645,727 A | * | 7/1997 | Bhave et al. | 210/651 |
| 5,736,195 A | * | 4/1998 | Haaland | 427/180 |
| 5,965,027 A | * | 10/1999 | Allen et al. | 210/638 |
| 6,077,437 A | * | 6/2000 | Hayashi et al. | 210/651 |
| 2002/0012626 A1 | * | 1/2002 | Tanaka et al. | 423/584 |
| 2005/0155625 A1 | * | 7/2005 | Jangjian et al. | 134/1.1 |

* cited by examiner

Primary Examiner—Joseph W Drodge
(74) Attorney, Agent, or Firm—J.C. Patents

(57) ABSTRACT

A method of removing silicon dioxide from a waste liquid is described. A solution containing fluoride ions is added into the waste liquid to form a reaction product. A method of cleaning a membrane tube for processing waste water is also described, wherein the membrane tube contains residues of waste water that include a first residue and a second residue containing silicon dioxide. A first cleaning step is conducted to reduce the concentration of the first residue in the membrane tube to a first concentration. A solution containing fluoride ions is added into the tube to react with the second residue to form a reaction product. A second cleaning step is then conducted to reduce the concentration of the residual fluorine ions in the membrane tube to a second concentration.

33 Claims, 2 Drawing Sheets

METHOD OF REMOVING SILICON DIOXIDE FROM WASTE LIQUID, METHOD OF CLEANING MEMBRANE TUBE AND METHOD OF PROCESSING WASTE WATER

BACKGROUND OF THE INVENTION

1. Field of the Invention

The present invention relates to a method of removing silicon dioxide from a solution or equipment. More particularly, the present invention relates to a method of removing $SiO_2$ from a waste liquid, to a method of cleaning a membrane tube for processing waste water containing $SiO_2$, and to a method of processing waste water containing $SiO_2$.

2. Description of the Related Art

In the semiconductor industry, waste water from chemical mechanical polishing (CMP) processes is always a big problem to all semiconductor fabs over the world. The composition of CMP waste water is quite complicated and includes a large amount of solid suspension. Methods of processing CMP waste water are generally divided into two categories, wherein the first one utilizes chemical coagulation to treat CMP waste water without recovery, and the second one utilizes filtration for recovery.

Because the amounts of $SiO_2$ particles and other solid particles are quite large in CMP waste wafer, the membrane tube used for filtration is easily clogged and therefore has a short lifetime. When a membrane tube is seriously clogged with $SiO_2$, a highly basic solution is conventionally used to remove the clog in consideration that $SiO_2$ has higher solubility in a high-pH environment. However, since $SiO_2$ is dissolved merely in a concentration of about 1000 ppm in an environment of pH>12 and requires ling-time dip and stir for dissolution, the effect of the method is too insufficient to solve the clogging issue of membrane tubes.

Moreover, the method of removing clog with a highly basic solution is merely based on a physical mechanism without any chemical reaction, so that the cleaning efficiency is quite low. Since the cleaning effect is insufficient, a membrane tube has to be replaced after being used for 30 months due to serious clogging, so that much manpower and money are consumed.

SUMMARY OF THE INVENTION

In view of the foregoing, this invention provides a method for removing $SiO_2$ from a waste liquid, which is based on the reaction of $SiO_2$ and a solution containing fluoride ions.

This invention also provides a method of cleaning a membrane tube for processing waste water containing $SiO_2$, which converts $SiO_2$ to a gaseous compound through a chemical reaction to remove the clog from the membrane tube.

This invention further provides a method of processing waste water that contains abrasive particles and an oxidant, wherein a membrane tube is used and then cleaned with the method of cleaning a membrane tube of this invention.

The method for removing silicon dioxide from a waste liquid of this invention is described as follows. A waste liquid containing silicon dioxide is provided, and then a solution containing fluoride ions is added into the waste liquid at a temperature to cause a chemical reaction that forms a reaction product.

In the above method, the concentration of fluoride ion in the solution containing fluoride ions preferably range from 1 wt % to 40 wt %, and the solution containing fluoride ions preferably include a solution of ammonium fluoride ($NH_4F$) or ammonium hydrofluoride ($NH_4HF_2$). The reaction product is normally a gaseous compound, silicon tetrafluoride ($SiF_4$).

The above reaction temperature is preferably 10° C.-50° C. In addition, the waste liquid may be CMP waste water generated from a semiconductor fab or a testing and packaging fab.

The method of cleaning a membrane tube for processing waste water containing $SiO_2$ is described as follows, wherein the membrane tube contains residues of the waste water that include a first residue and a second residue containing $SiO_2$. A first cleaning step is conducted to reduce the concentration of the first residue in the membrane tube to a first concentration. A solution containing fluoride ions is added into the tube at a temperature to react with the second residue to form a reaction product. Then, a second cleaning step is conducted to reduce the concentration of the residual fluorine ions in the membrane tube to a second concentration.

In the above method, the first residue may include a compound that causes an exothermic reaction with fluoride ions, such as, hydrogen peroxide ($H_2O_2$). In such cases, the first cleaning step may include a step of flushing the membrane tube with pure water. An additional inspection step may be conducted after the first cleaning step to inspect the concentration of the residual $H_2O_2$, possibly using a hydrogen peroxide test paper.

Moreover, the above first concentration of the first residue is preferably less than 10 ppm. The concentration of fluoride ion in the solution containing fluoride ions, the species of the fluoride compound dissolved in the solution, the reaction temperature and the reaction product may be the same as those mentioned in the above method of removing $SiO_2$ from a waste liquid of this invention.

In addition, the reaction product formed may be introduced into a washing tower, and the second cleaning step may include a step of rinsing the membrane tube with pure water. The second concentration of the residual fluoride ions is less than 10 ppm.

The method for processing CMP waste water containing abrasive particles and an oxidant of this invention is described as follows. The CMP waste water is firstly filtered with a membrane tube, and then the membrane tube is cleaned with at least the following steps. A first cleaning step is conducted to reduce the concentration of the oxidant in the waste water remaining in the membrane tube to a first concentration. A reactive solution is added into the membrane tube at a temperature to react with the abrasive particles to form a volatile compound. Then, a second cleaning step is conducted to reduce the concentration of the reactive solution remaining in the membrane tube to a second concentration.

In the above method, the oxidant may be $H_2O_2$. In such cases, the first cleaning step may include a step of flushing the membrane tube with pure water. An additional inspection step may be conducted after the first cleaning step to inspect the concentration of the residual $H_2O_2$, possibly using a hydrogen peroxide test paper. The first concentration of the oxidant is preferably less than 10 ppm.

Moreover, the reactive solution may be a solution containing fluoride ions, wherein the concentration of fluoride ion is preferably 1-40 wt %, and the solution may be a solution of $NH_4F$ or $NH_4HF_2$. In such cases, the volatile compound will be $SiF_4$. After the second cleaning step, the second concentration of the residual fluorine ions is preferably less than 10 ppm.

In addition, the volatile compound may be further conducted into a washing tower. The second cleaning step may include a step of rinsing the membrane tube with pure water.

As mentioned above, considering that fluorine ion can react with $SiO_2$, this invention adds $NH_4F$ or $NH_4HF_2$ into the waste water to react with $SiO_2$ therein to form gaseous $SiF_4$. By applying this invention to a CMP system, the silicon dioxide as the clog in a membrane tube can be removed through chemical reaction, so that the lifetime of the membrane tube can be increased to save the manpower and money required for replacement of membrane tubes. Since this invention utilizes chemical reaction to remove $SiO_2$, the cleaning efficiency and effect thereof are better than those of the conventional base-washing method.

It is to be understood that both the foregoing general description and the following detailed description are exemplary, and are intended to provide further explanation of the invention as claimed.

DESCRIPTION OF THE PREFERRED EMBODIMENTS

Figure 1:
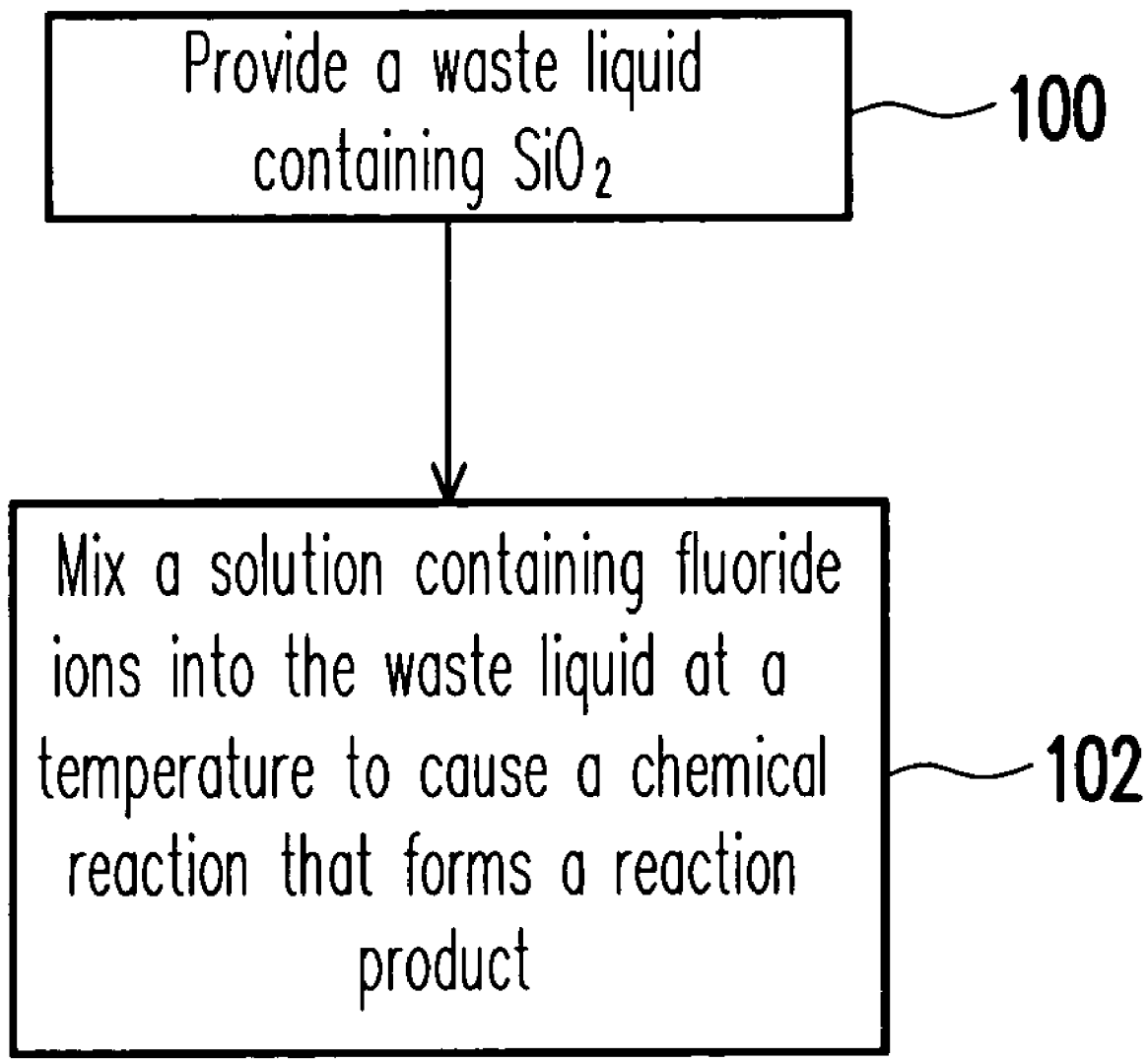
FIG. 1 illustrates a process flow of a method of removing $SiO_2$ from a waste liquid according to a preferred embodiment of this invention.

Referring to FIG. 1, in step 100, a waste liquid containing $SiO_2$ is provided. The waste liquid may be the waste water generated from a CMP process.

In next step 102, a solution containing fluoride ions is mixed into the waste liquid at a temperature to cause a chemical reaction that forms a reaction product. The concentration of fluoride ion in the solution is 1-40 wt %, for example, the solution may be a solution of $NH_4F$ or $NH_4HF_2$, the reaction product is normally a gaseous compound ($SiF_4$), and the reaction temperature is preferably 10° C.-50° C. When a solution of $NH_4F$ is used, the formulae of the above chemical reaction are:

$$NH_4F + H_2O \leftrightarrows HF + NH_4OH \quad (1)$$

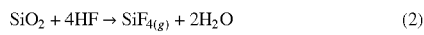
$$SiO_2 + 4HF \rightarrow SiF_{4(g)} + 2H_2O \quad (2)$$

Figure 2:
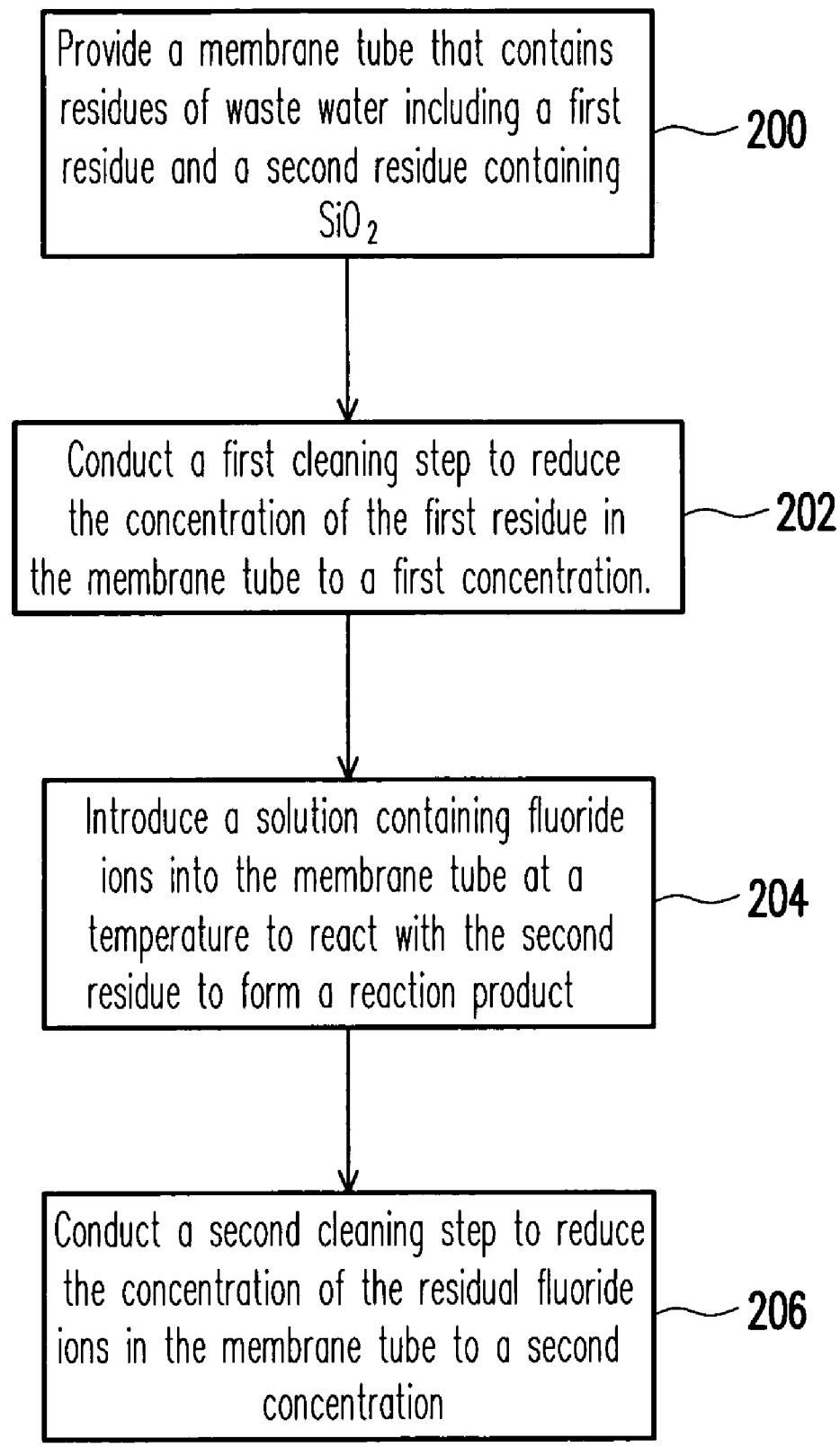
FIG. 2 illustrates a process flow of a method of cleaning a membrane tube for processing waste water containing $SiO_2$ according to the preferred embodiment.

FIG. 2 illustrates a process flow of a method of cleaning a membrane tube for processing waste water containing $SiO_2$ according to the preferred embodiment of this invention. In step 200, a membrane tube clogged with residues of the waste water is provided, wherein the residues include a first residue and a second residue containing $SiO_2$. The waste water may be one generated from a CMP process, the membrane tube may be a micro-filter tube and may be connected to a CMP apparatus, and the first residue may include compound that causes an exothermic reaction with a solution containing fluoride ions. In the preferred embodiment, the first residue may be $H_2O_2$, which may take an amount of 0.1-1.0 wt % in the waste water. In another embodiment, the waste water may originally include waste water containing $SiO_2$ and that containing metal particles. Since the size of metal particles is larger, the waste water containing metal particles is preferably isolated from the water-processing system to avoid clogging of the membrane tubes. The waste water containing metal particles may be treated with chemical coagulation, while the waste water containing $SiO_2$ is filtered with the membrane tubes.

In next step 202, a first cleaning step is conducted, for example, by flushing the membrane tube with pure water, to reduce the concentration of the first residue in the membrane tube to a first concentration. When the first residue is $H_2O_2$, the first concentration is preferably less than 10 ppm. The first cleaning step of reducing $H_2O_2$ concentration is conducted to avoid the pore size of the membrane from being increased or to avoid the membrane from being dissolved due to the exothermic reaction of fluorine ions and $H_2O_2$ in high concentration. Moreover, an inspection step can be conducted after the first cleaning step to measure the concentration of the residual $H_2O_2$ by using, for example, a hydrogen peroxide test paper.

In next step 204, a solution containing fluoride ions is introduced into the membrane tube at a temperature to react with the second residue containing $SiO_2$ to form a reaction product. The concentration of fluoride ion in the solution is preferably 1-40 wt %, the solution may be one of $NH_4F$ or $NH_4HF_2$, and the reaction temperature is preferably 10° C.-50° C. The reaction product is normally a gaseous compound, $SiF_4$. When a solution of $NH_4F$ is used, the formulae of the chemical reaction are the same as formulae (1) and (2) mentioned above. In addition, since $SiF_4$ readily react with the moisture in the atmosphere to produce HF that will harm human body and the environment, the gaseous reaction product ($SiF_4$) is preferably introduced into a washing tower instead of being emitted directly into the atmosphere.

In next step 206, a second cleaning step is conducted to reduce the concentration of the residual fluoride ions in the membrane tube to a second concentration, so that the hydrogen peroxide in the waste water processed later will not cause an excessive exothermic reaction with the residual fluoride ions in high concentration to destroy the membrane of the tube. The second cleaning step is done by, for example, rinsing the membrane tube with pure water, and the second concentration is preferably less than 10 ppm.

Moreover, the method of processing CMP waste water containing abrasive particles and an oxidant according to the preferred embodiment of this invention can also utilize the above steps to clean the membrane tubes after the membrane tubes are used to filter the CMP waste water.

As mentioned above, this invention converts $SiO_2$ to a gaseous compound through chemical reaction. By applying the method to a CMP system, the silicon dioxide as the clog in a membrane tube can be removed, so that the lifetime of the membrane tube can be increased to save the manpower and money required for replacement of membrane tubes. Meanwhile, the efficiency and effect of cleaning the membrane tube can be improved effectively.

It is noted that the above CMP waste water is not restricted to be one generated from a semiconductor fab. This invention can also be applied to process CMP waste water generated from any other type of factory that implements CMP processes, such as, a testing and packaging fab.

Moreover, since the method of this invention is based on chemical conversion of $SiO_2$ into a gaseous compound, this invention can be used to treat any type of waste water containing $SiO_2$ other than the above CMP waste water.

Furthermore, though the above embodiment features conversion of $SiO_2$ into an easily separatable form like a volatile gaseous compound, the spirit of this invention can also be applied to processing of a solution containing other compound or particle species required to remove, wherein the compound or particle species is converted into a gaseous compound or any other easily separatable form through chemical reaction.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for removing silicon dioxide from a membrane containing a waste liquid, comprising:
   providing a membrane containing a waste liquid, the membrane or the waste liquid containing silicon dioxide; and
   adding, at a temperature, a solution containing fluoride ions into the waste liquid to cause a chemical reaction that forms a reaction product comprising a gaseous compound.

2. The method of claim 1, wherein a concentration of fluoride ion in the solution ranges from 1wt% to 40wt%.

3. The method of claim 1, wherein the solution comprises a solution of $NH_4F$ or $NH_4HF_2$.

4. The method of claim 1, wherein the gaseous compound comprises $SiF_4$.

5. The method of claim 1, wherein the temperature ranges from 10° C. to 50° C.

6. The method of claim 1, wherein the waste liquid comprises CMP waste water from a semiconductor fab or a testing and packaging fab.

7. The method of claim 1, wherein the membrane comprises a membrane tube.

8. A method of cleaning a membrane tube for processing waste water, wherein the membrane tube contains residues of the waste water that include a first residue containing $H_2O_2$ and a second residue containing silicon dioxide therein, the method comprising:
   conducting a first cleaning step to reduce a concentration of the first residue in the membrane tube to a first concentration;
   adding, at a temperature, a solution containing fluoride ions into the membrane tube to react with the second residue to form a reaction product; and
   conducting a second cleaning step to reduce the concentration of residual fluorine ions in the membrane tube to a second concentration.

9. The method of claim 8, wherein the first cleaning step comprises: flushing the membrane tube with pure water.

10. The method of claim 8, further comprising an inspection step after the first cleaning step for inspecting a concentration of residual $H_2O_2$.

11. The method of claim 10, wherein the inspection step comprises: using a hydrogen peroxide test paper to measure the concentration of the residual $H_2O_2$.

12. The method of claim 8, wherein the first concentration is lower than 10ppm.

13. The method of claim 8, wherein a concentration of fluoride ion in the solution containing fluoride ions ranges from 1wt% to 40wt%.

14. The method of claim 8, wherein the solution containing fluoride ions comprises a solution of $NH_4F$ or $NH_4HF_2$.

15. The method of claim 8, wherein the temperature ranges from 10° C. to 50° C.

16. The method of claim 8, wherein the reaction product comprises a gaseous compound.

17. The method of claim 16, wherein the gaseous compound comprises $SiF_4$.

18. The method of claim 8, further comprising:
   introducing the reaction product into a washing tower.

19. The method of claim 8, wherein the second cleaning step comprises:
   rinsing the membrane tube with pure water.

20. The method of claim 8, wherein the second concentration is less than 10ppm.

21. A method for processing CMP waste water containing abrasive particles and an oxidant, comprising:
   filtering the CMP waste water with a membrane tube; and
   cleaning the membrane tube, comprising:
   conducting a first cleaning step to reduce a concentration of the oxidant in the waste water remaining in the membrane tube to a first concentration;
   adding, at a temperature, a reactive solution containing a reactive species into the membrane tube to react with the abrasive particles filtered from the CMP waste water to form a volatile compound; and
   conducting a second cleaning step to reduce the concentration of the reactive species remaining in the membrane tube to a second concentration.

22. The method of claim 21, wherein the oxidant comprises $H_2O_2$.

23. The method of claim 22, wherein the first cleaning step comprises:
   flushing the membrane tube with pure water.

24. The method of claim 23, further comprising an inspection step after the first cleaning step for inspecting a concentration of residual $H_2O_2$.

25. The method of claim 24, wherein the inspection step comprises:
   using a hydrogen peroxide test paper to measure the concentration of the residual $H_2O_2$.

26. The method of claim 21, wherein the first concentration is less than 10ppm.

27. The method of claim 26, wherein a concentration of fluoride ion in the solution containing fluoride ions ranges from 1wt% to 40wt%.

28. The method of claim 21, wherein the reactive solution comprises a solution containing fluoride ions.

29. The method of claim 28, wherein the solution containing fluoride ions comprises a solution of $NH_4F$ or $NH_4HF_2$.

30. The method of claim 28, wherein the volatile compound comprises $SiF_4$.

31. The method of claim 28, wherein the second concentration is less than 10ppm.

32. The method of claim 21, further comprising:
   introducing the volatile compound into a washing tower.

33. The method of claim 21, wherein the second cleaning step comprises:
   rinsing the membrane tube with pure water.

* * * * *